3,255,561
WALLBOARD TRIM CONSTRUCTION
Grover C. Cable, Huntington Park, Calif., assignor to Angeles Metal Trim Co., Los Angeles, Calif., a corporation of California
Continuation of abandoned application Ser. No. 602,310, Aug. 6, 1956. This application Feb. 23, 1960, Ser. No. 10,508
19 Claims. (Cl. 52—255)

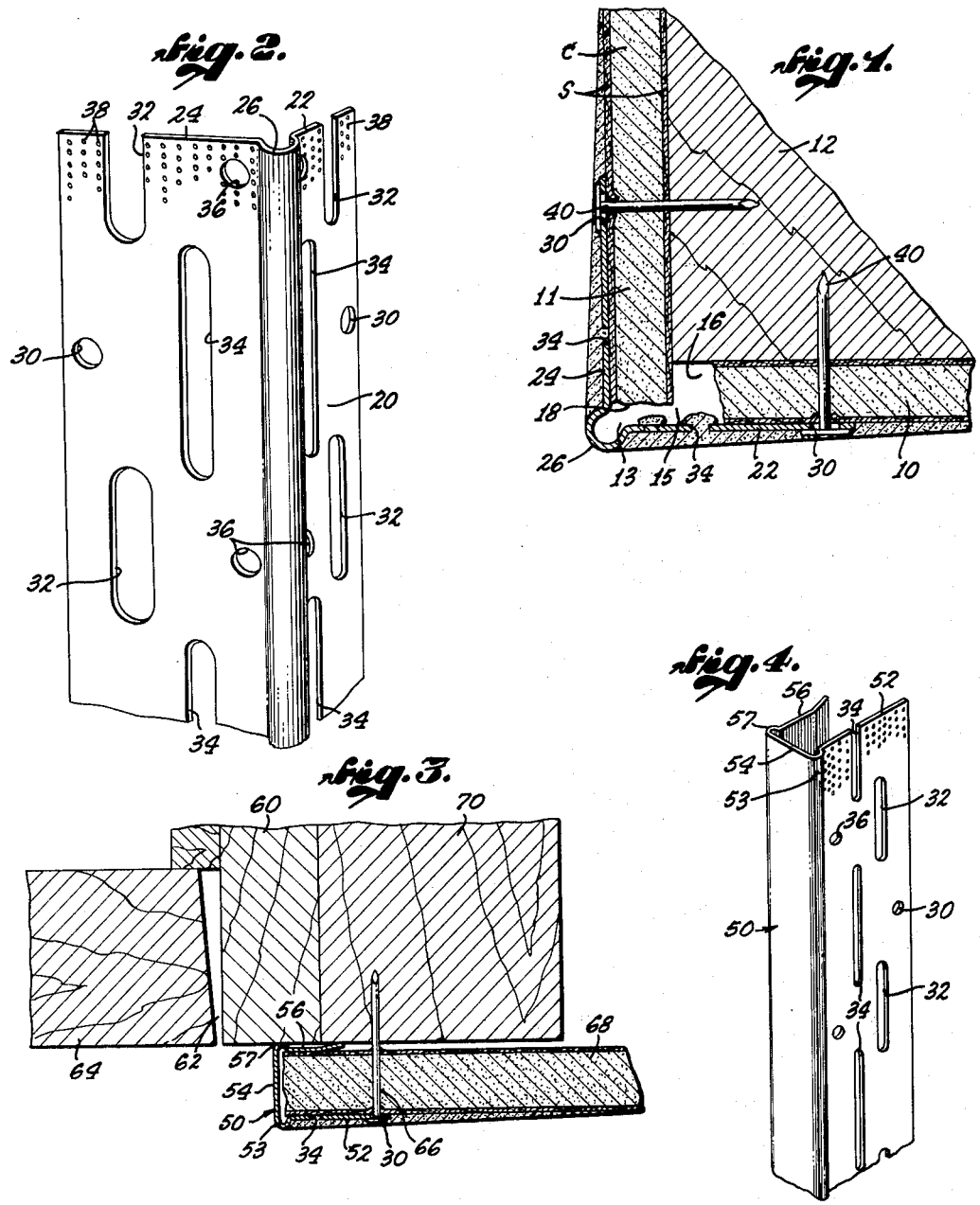

This invention relates to improvements in building construction, and more particularly to an improved metal trim for use in dry-wall type construction. This application is a continuation of my prior application, Serial Number 602,310, filed August 6, 1956, now abandoned.

In applying dry-wall construction to homes and other buildings, the walls are formed by means of wallboard, such as gypsum rock panels, having cardboard or similar sheets on the outer surfaces thereof. Where the edge of a piece of wallboard lies at a corner of a wall structure, whether it be the corner formed by the intersection of two wall surfaces or whether it be a corner formed along the edge of a door, window, or other opening, it is desirable to make some provision for protecting and concealing the edge of the wallboard. Numerous types of metal trim members have been employed for this purpose. In one type of trim member, the trim member is provided with a bead to form a rigid edge at a corner formed thereby, and a section of the trim member that is placed along the wall surface of the wallboard is provided with bonding holes and joint cement is applied over that trim section in the reentrant portion of the trim member between the bead and beyond the edge of said trim section in order to conceal the trim section and to form a monolithic structure. Portions of the joint cement that enter the bonding holes are locked therein either by virtue of the cementitious bond formed between the joint cement and the portion of the wallboard opposite the bonding holes or because of enlarged portions of the joint cement that are formed on the inner side of the bonding holes, thereby forming key-locks with the trim section.

Heretofore the bonding holes that have been employed for this purpose have generally been circular in shape and have been located at positions along the length of the trim member that are spaced apart by distances substantially greater than the diameters of the bonding holes. Such bonding holes have not proved entirely satisfactory, and installations employing trim members with such bonding holes have been subject to serious fracture of the joint cement, thus detracting from the appearance of the wall.

In order to form a smooth monolithic structure, it is very desirable that the trim section be relatively thin and flat so that it can be laid flat against the wallboard or can form, in effect, an extension of the outer surface thereof. It is also desirable that the bead be small.

One of the objects of this invention is to provide an improved metal trim member for protecting and concealing the edges of sections of wallboard at various corners, and which is provided with improved means for locking the joint cement in place.

Another object of the invention is to provide an improved trim member of the type described with bonding holes to improve the adherence of the joint cement to the structure.

Another object of the invention is to provide such a trim member with bonding holes that are so proportioned and arranged that they do not seriously weaken the trim member and thereby interfere with its easy handling and its easy application to the corner to be protected and concealed.

The foregoing and other objects of this invention, together with various advantages thereof, will become apparent from the following description taken in connection with the accompanying drawing, wherein:

FIGURE 1 is a cross-sectional view of a corner of a wall embodying the present invention;

FIG. 2 is a perspective view of a section of corner-bead trim member embodying the invention;

FIG. 3 is a cross-sectional view of a wall structure embodying another form of the invention; and FIG. 4 is a perspective view of the metal trim member employed in the wall structure of FIG. 3.

Referring to the drawing, and particularly to FIG. 1, there is illustrated a wall corner to which an improved corner-bead trim member of the type illustrated in FIG. 2 has been applied. In this embodiment of the invention, a pair of pieces of wallboard 10 and 11 are laid on adjacent faces of a four-by-four or other structural member 12, thereby forming a pair of walls that lie at a right angle and that intersect at a corner. Each piece of wallboard is generally formed by a core C of gypsum rock material bonded tightly between two parallel sheets S of cardboard or other cover material.

Sometimes the edge 13 of one of the pieces of wallboard lies in the plane of the outer edge of the other piece of wallboard, and the end 15 of the other piece of wallboard 10 abuts the adjacent end of the other piece of wallboard 11, forming a clearly defined right-angle corner. Other times, however, a good fit is not provided, especially where, as in the example illustrated in FIG. 1, the edge of a piece of wallboard has been broken away, thus leaving a cavity 16 between the edge of the piece of wallboard 10 and the other piece of wallboard 11, or even leaving a vacant space 18 at a corner formed by the two pieces of wallboard.

To complete and finish and strengthen the corner, a strip of corner-bead metal trim 20, as illustrated in FIG. 1, is laid along the corner. The metal trim member 20 is of unitary construction and is formed from an elongated strip of metal which is shaped to provide a pair of straight substantially planar trim sections 22 and 24 joined together by means of a convex bead 26. The two side sections 22 and 24 are substantially flat, and each of them is of elongated rectangular configuration. The bead 26 may be of a number of different shapes, and in particular may have a circular arcuate cross-sectional configuration.

The two trim sections 22 and 24 are inclined to each other and are generally substantially orthogonal to each other in the best embodiments of the invention. Each of the trim sections 22 and 24 is provided with a row of nail holes 30 along the outer edge thereof remote from the bead 26. Each of the trim sections is also provided with at least two rows of bonding holes. The holes in at least one row are in the form of elongated slots. But, in the best embodiment of the invention, two rows of bonding slots are employed, in each of the trim sections 22 and 24 as illustrated in FIG. 2.

One row of elongated slots 32 is arranged along a line more nearly adjacent the row of nail holes 30. The other row of elongated slots 34 is arranged along a line nearer to the bead 26. For reasons which will become apparent hereinafter, the inner slots 34 are longer than the outer slots 32, and they are narrower than the outer slots. In the best embodiment of the invention, the slots extend lengthwise of the trim member and substantially parallel to the bead 26. The lengths of the slots are made less than about the widths of the trim sections 22 and 24 and the widths of the slots are much smaller than the widths of the trim sections so that the slots do not make the trim member so flexible or flimsy that the trim member cannot be easily handled and applied as described hereinafter. Such retention of rigidity is enhanced by arranging the slots substantially parallel to the length of the trim member.

In the form of the invention illustrated in FIGS. 1 and 2, the lengths of the slots 32 and 34 are such that adjacent slots in the two rows do not overlap. However, only very small lengthwise sections of each trim section are free of slots. In other words, the projections of the slots 32 and 34 onto a base line along the length of the trim member, such as the outer edge of either trim section 22 or 24, do not overlap. A fourth row of holes 36 is formed in each trim section 22 and 24 along a line adjacent the bead 26 and between the bead 26 and the nearest row of slots 34. The centers of the bonding holes 36 are located opposite the outer slots 32, while the nail holes 30 are located opposite the inner slots 34. Knurling 38 is formed on the surface of each trim section 22 and 24, thus rendering both surfaces of each trim section slightly irregular.

In one specific embodiment of the invention as applied to the corner bead that has been found to be very satisfactory in practice, the corner bead was made of 26-gauge bonderized stell strip forming a corner bead having an external diameter of about ⅛" and having trim sections having widths of about ⅞". The outer slots 32 had lengths of 9/16" and widths of 3/32". The inner slots 34 had lengths of 13/16" and widths of 1/16". The nail holes 30 and the bonding holes 36 were of the same size and had diameters of ⅛". The centers of the holes in each row were spaced 1½" apart. Furthermore, the holes 30, 32, 34, and 36 were located 3/32", 15/32", ⅝", and ¾" respectively from the outer edge of the trim section in which they were formed. Such trim members are manufactured in standard lengths of, say, 8 feet.

To apply the trim member 20 of FIG. 2 to a corner, as illustrated in FIG. 1, a trim member of suitable length is placed at the corner with the two trim sections 22 and 24 disposed along the outer surfaces of the two pieces of wallboard 10 and 11. Suitable fastener elements, such as nails 40, driven through alternate nail holes 30 and through the adjacent pieces of wallboard into the wood structural member 12 assure a rigid mounting of the trim member 20 in place. When so mounted, the trim sections 22 and 24 constitute, in effect, extensions of the outer surfaces of the pieces of wallboard 10 and 11 to a rigid round corner formed by the bead 26. When so mounted, a reentrant portion is provided along each trim section 22 and 24 between the bead 26 and the outer edge of the trim section.

To finish the installation, a body of filler material, or joint cement, is applied over each trim section, filling each of the reentrant portions and covering the outer edges of the trim sections and the adjacent parts of the wallboard. Preferably three coats of such a filler material are applied in such a way as to form a flat, gradually tapered body of filler material that covers and conceals the trim sections 22 and 24 and the adjacent portions of the pieces of wallboard. In applying the joint cement, it is squeezed into and through the bonding slots 32 and 34 and the bonding holes 36.

In locations where the slots 34 and holes 36 are disposed close to the external paper coatings on the outer surfaces of the pieces of wallboard 10 and 11, the joint cement adheres directly to the paper. In other locations, such as where cavities or other recesses 16 and 18 are formed, joint cement passes through the slots 34, bulging outwardly and forming key-locks. In some cases, the knurling produces slight gaps between the trim sections 22 and 24 and the wallboard, thus permitting some joint cement to seep behind the trim sections 22 and 24 and thus aid in locking the joint cement in place. Similarly, joint cement entering or passing through the bonding holes 36 either becomes adhered to the gypsum rock composition forming the core C of the adjacent piece of wall-board or forms a key-lock. Inasmuch as cavities 16 are more likely to be located adjacent the inner slots 34, best results are obtained by making these slots long and narrow, since this reduces the amount of joint cement likely to be squeezed through the slots 34.

By smoothing the outer surface of the filler material, it is readily feathered at the points where it covers the wallboard, and it is rendered flush with the outer edge of the bead 26. The entire surface of the wall is then painted, thus forming a flat smooth monolithic structure.

By employing bonding holes in the form of slots, as described above, portions of the joint cement are firmly secured to the trim member throughout its entire length. With this type of structure, the joint cement is secured more firmly in place, and the joint cement is therefore less liable to fracture or to be chipped off or to strip because of impacts on the bead or otherwise.

In FIG. 3, another embodiment of the invention is illustrated employing a channel-shaped trim member of the type illustrated in FIG. 4. This specific type of trim member, except for the bonding arrangement, is the same as that disclosed and described in Patent No. 2,725,608 issued to Angeles Metal Trim Co. on the basis of an application by Thomas W. Parslow. In this case, however, the trim member is U-shaped, being provided with a front trim section 52, a side trim section 54, and a rear trim section 56. The rear edge of the side section 54 is joined to the rear section 56 by a rear bead 57, and the front edge of the side section 54 is joined to the front section by a bead 53, all as described in more detail in said patent. The side trim section is plane and free of holes so as to provide a smooth finished surface. In this case, nail holes 30 and bonding holes 32, 34, and 36 are arranged as described above in the front section 52 only. In this particular case, however, the projections of the bonding holes 32 and 34 in the different rows onto a line extending lengthwise of the metal trim member 50 may overlap slightly as shown in FIG. 4, or not at all as seen in FIG. 2. Both in this case and in that described above, the projections of the bonding holes onto such a line occupy at least substantially all of that line.

The metal trim member 50 is mounted in place with the rear bead 57 pressed against the outer exposed surface of a structural member 60, such as a jamb surrounding an opening 62 for a door 64, and the trim member is secured firmly in place by means of nails 66 driven through nail holes 30 and through a piece of wallboard 68 into another structural member, such as a cripple 70. As in the case described above, joint cement is disposed in the reentrant portion formed by the front bead 53 and the front section 52, becoming securely locked in place and covering and concealing the front section 52, the heads of the nails 66, and the adjacent portion of the wallboard 68.

While the invention has been described with particular reference to a specific embodiment thereof, it will now be obvious to those skilled in the art that many changes may be made in the shape and dimensions of the parts and in the material from which the trim member is made without departing from the invention. More particularly, it will be understood that changes may be made in the size and shape of the slots and the other holes without departing from the principles of the invention. Furthermore, even though the invention has been described only with reference to its application to trim members that have two trim sections that are arranged orthogonally with respect to each other, the invention may be applied to trim members in which the trim sections are arranged at some other angle, and that the invention may be applied to other types of trim members as well. It is therefore to be understood that the invention is not limited to the specific embodiments thereof that have been described in detail herein, but includes other embodiments within the scope of the appended claims.

The invention claimed is:

1. In combination with a structural member of a building and a substantially flat piece of wallboard overlying said structural member:

an elongated unitary trim member substantially rigid, both transversely and longitudinally and comprising a pair of straight substantially planar trim sections and having an elongated convex bead joining said trim sections along a common junction edge extending lengthwise of said trim member, said trim sections being inclined to each other, said trim member being disposed over an edge of said piece of wallboard, one of said trim sections being disposed upon the outer face of said piece of wallboard and the other of said trim sections extending in a direction to cover and protect said edge of said piece of wallboard whereby said bead forms a rigid corner and provides a reentrant portion along one trim section, said trim member and wallboard further defining a cavity adjacent the interior of said trim member and between said structural member and said edge of said wallboard;

a plurality of fasteners extending through said one trim section and thence through said piece of wallboard into said structural member;

said one trim section having at least two substantially parallel rows of openings formed therein between said bead and the edge of said one trim section remote from said bead, the openings in at least one of said rows being in the form of elongated slots that extend lengthwise of said trim member and overlie said wallboard, the openings in the other of said rows including openings having a lesser open area than that of any of said elongated slots and disposed to overlie said cavity;

and a body of filler material adjacent said one trim section and filling the reentrant portion thereof, the outer surface of said filler material being flush with the outer edge of said elongated bead, said body of filler material covering the ege of said one trim section remote from said bead, whereby the edge of said one trim section and the adjacent portion of said wallboard are concealed, portions of said body of filler material extending in different amounts through said differently sized openings and being locked therein.

2. In combination with a structural member of a building and a substantially flat piece of wallboard overlying said structural member, said piece of wallboard defining a cavity between a portion thereof and said structural member:

an elongated unitary trim member substantially rigid, both transversely and longitudinally and comprising a pair of straight substantially planar trim sections and having an elongated convex bead joining said trim sections along a common junction edge extending lengthwise of said trim member, said trim sections being inclined to each other, said trim member being disposed over an edge of said piece of wallboard in overlying relation to a surface of said wallboard, as well as in overlying relation to said cavity, one of said trim sections being disposed upon the outer face of said piece of wallboard and the other of said trim sections extending in a direction to cover and protect said edge of said piece of wallboard whereby said bead forms a rigid corner closing said cavity and a portion of said wallboard and provides a reentrant portion along said one trim section;

a plurality of fasteners extending through said one trim section and thence through said piece of wallboard into said structural member;

said one trim section having at least two substantially parallel rows of elongated slots formed therein between said bead and the edge of said one trim section remote from said bead, said slots extending lengthwise of said trim member, the projections of said slots onto a base line along the length of said trim member occupying substantially all of said line without substantial overlapping, some of said slots overlying the surface of said wallboard and others of said slots overlying said cavity, said other slots being narrower than said first-mentioned slots;

and a body of filler material adjacent said one trim section and filling the reentrant portion thereof, the outer surface of said filler material being flush with the outer edge of said elongated bead, said body of filler material covering the edge of said one trim section remote from said bead, whereby the edge of said one trim section and the adjacent portion of said wallboard are concealed, portions of said body of filler material extending through said slots and being locked therein.

3. In the combination specified in claim 2, an elongated trim member in which the lengths of said slots are less than about the width of said one trim section.

4. In the combination specified in claim 2, an elongated trim member in which the widths of said slots are small compared with the width of said one trim section.

5. In the combination specified in claim 2, an elongated trim member in which the lengths of said slots are less than about the width of said one trim section and the widths of said slots are small compared with the width of said one trim section.

6. The combination specified in claim 2, wherein said elongated trim member has an auxiliary row of bonding holes located between said rows of slots and said bead, said bonding holes being positioned opposite the spaces between successive slots of the row of slots that is nearest said bead.

7. A combination as in claim 2 wherein slots in one of said parallel rows are longer than the slots in the other of said parallel rows and the longer slots are narrower than the shorter slots.

8. In combination with a structural member of a building and a substantially flat piece of wallboard overlying said structural member:

an elongated unitary trim member substantially rigid, both transversely and longitudinally and comprising a pair of straight substantially planar trim sections and having an elongated convex bead joining said trim sections along a common junction edge extending lengthwise of said trim member, said trim sections being arranged substantially orthogonal with respect to each other, said trim member being disposed over an edge of said piece of wallboard, one of said trim sections being disposed upon the outer face of said piece of wallboard and the other of said trim sections extending in a direction substantially normal to said outer face and in a direction to cover and protect said edge of said piece of wallboard whereby said bead forms a rigid corner and provides a reentrant portion along said one trim section;

means for fastening said unitary trim member to said piece of wallboard;

said one trim section having at least two substantially parallel rows of differently dimensioned elongated slots formed therein between said bead and the edge of said one trim section remote from said bead, said slots extending lengthwise of said trim member, the projections of said slots onto a base line along the length of said trim member occupying substantially all of said line without substantial overlapping;

and a body of filler material adjacent said one trim section and filling the reentrant portion thereof, the outer surface of said filler material being flush with the outer edge of said elongated bead, said body of filler material covering the edge of said one trim section remote from said bead, whereby the edge of said one trim section and the adjacent portion of said wallboard are concealed, portions of said body of filler material extending in different amounts, through said differently dimensioned elongated slots and being locked therein.

9. In combination with a structural member of a building and a pair of substantially flat pieces of wallboard overlying adjacent parts of said structural member and forming a corner adjacent said structural member:

an elongated unitary trim member substantially rigid, both transversely and longitudinally and comprising a pair of straight substantially planar trim sections and having an elongated convex bead joining said trim sections along a common junction edge extending lengthwise of said trim member, said trim sections being inclined to each other, said trim member being disposed upon the respective pieces of wallboard in a position to cover and protect the edges of said pieces of wallboard adjacent said structural member, whereby said bead forms a rigid corner adjacent said first-mentioned corner and provides reentrant portions along said trim sections;

fastening means extending from each of said trim sections for fastening said pair of trim sections to said pair of pieces of wallboard respectively;

each said trim section having at least two substantially parallel rows of openings formed therein between said bead and the edge of each said trim section remote from said bead, the openings in at least one of said rows of each trim section being in the form of slots extending lengthwise of said trim member, the projections of said openings of each said trim section onto a base line extending along the length of said trim member occupying substantially all of said line without substantial overlapping;

and a body of filler material disposed on each said trim section and filling the corresponding reentrant portion of said trim member, the outer surface of said filler material being flush with the outer edge of said elongated bead, said bodies of filler material covering the edges of said trim sections remote from said bead, whereby each of said trim sections and the adjacent portions of said wallboard are concealed, portions of said bodies of filler material extending through said openings and being locked therein.

10. In combination with a structural member of a building and a pair of substantially flat pieces of wallboard overlying adjacent parts of said structural member and being at right angles to each other, thereby forming a corner adjacent said structural member:

an elongated unitary trim member substantially rigid, both transversely and longitudinally and comprising a pair of straight substantially planar trim sections and having an elongated convex bead joining said trim sections along a common junction edge extending lengthwise of said trim member, said trim sections being orthogonal to each other, said trim member being disposed upon the respective pieces of wallboard in a position to cover and protect the edges of said pieces of wallboard adjacent said structural member, whereby said bead forms a rigid corner adjacent said first-mentioned corner and provides reentrant portions along said trim sections;

each said trim section having at least two substantially parallel rows of elongated slots formed therein between said bead and the edge of each said trim section remote from said bead, said slots extending lengthwise of said trim member and the elongated slots in one of said rows being disposed in staggered relation to the elongated slots in the other of said rows, the projections of said slots of each said trim section onto a base line along the length of said trim member occupying substantially all of said line without substantial overlapping;

and a body of filler material disposed on each said trim section and filling the reentrant portion thereof, the outer surface of said filler material being flush with the outer edge of said elongated bead, said bodies of filler material covering the edges of said trim sections remote from said bead, whereby each of said trim sections and the adjacent portions of said wallboard are concealed, portions of said bodies of filler material extending through said slots and being locked therein.

11. An elongated unitary trim member which is substantially rigid both longitudinally and transversely, said trim member having a pair of straight substantially planar trim sections and having an elongated convex bead joining said trim sections along a common junction edge extending lengthwise of said trim member, said trim sections being arranged at an angle to each other for disposition around a corner of a building structure, whereby said bead will form a rigid corner at the corner of such building structure, said bead providing reentrant portions along said trim sections, each of said trim sections having at least two substantially parallel rows of elongated slots extending lengthwise of said trim section, the projections of said slots on each trim section onto a base line, which extends the length of said trim member, occupying substantially all of said base line without substantial overlapping, said rows of slots being laterally spaced on each trim section, and the slots of each row being longitudinally spaced along the trim section, whereby to retain substantial rigidity of the trim member both longitudinally and transversely, said slots being adapted to serve as bonding openings to receive filler material applied in said reentrant portions to lock such filler material in place.

12. An elongated rigid trim member as in claim 11 wherein at least some of the elongated slots in parallel rows closer to said bead are narrower than the elongated slots in parallel rows more remote from said bead, thereby to permit a lesser amount of said filler material to pass through said narrower slots than through said more remote slots.

13. A trim member as in claim 12 wherein said narrower slots in the parallel rows are longer than said other slots.

14. A trim member as in claim 11 wherein slots closer to said bead are longer than other slots and the longer slots are narrower than the shorter slots.

15. A trim member as in claim 11 wherein said trim sections have nail holes arranged in a row out of vertical alignment with said slots and disposed in transverse alignment with portions of respective slots transversely remote from the respective nail holes.

16. A trim member as in claim 15 wherein said nail holes are located along the outer edges of said trim sections and an auxiliary row of bonding holes is located between said slots and said bead and opposite the spaces between the slots of the nearest row of slots, and each of said bonding holes has an open area less than that of any of said slots.

17. In combination with a structural member of a building:

a pair of substantially flat pieces of wallboard overlying adjacent parts of said structural member and being disposed at right angles to each other, the edge portion of one of said wallboard pieces overhanging the adjacent edge of the other of said wallboard pieces and providing a substantially filled longitudinally extending corner adjacent said structural member;

an elongated trim member which is substantially rigid, both longitudinally and transversely, and includes a pair of straight substantially planar trim sections disposed substantially at right angles to each other and having an elongated convex bead joining said trim sections along a common junction edge extending lengthwise of said trim member, said trim sections being disposed upon the respective pieces of wallboard in a position to cover and protect said corner provided by the edge portions of said wallboard pieces, whereby said bead forms a rigid corner and provides re-entrant portions along said trim sections, each of said trim sections having at least two substantially parallel rows of differently dimensional elongated slots formed therein between said bead and the outer edge of the respective trim section, said slots extending lengthwise of said trim member, and the projections of said slots of each trim section onto a base line extending the length of the trim member occupying substantially all of said line without substantially overlapping.

18. A combination as in claim 17 wherein some of the slots of the parallel rows of slots of each trim section are longer than other slots and the longer slots are narrower than the shorter slots.

19. A combination as in claim 17 wherein a body of filler material is disposed on each of said trim sections and fills the reentrant portion thereof, portions of said filler material entering said slots and binding and locking said filler material to the trim sections throughout their length, the outer surfaces of said filler material being flush with the outer edge of said elongated bead and extending to and covering the edges of said trim sections remote from said bead.

References Cited by the Examiner

UNITED STATES PATENTS

| | | | |
|---|---|---|---|
| 1,308,773 | 7/1919 | Clark | 52—255 |
| 1,308,889 | 7/1919 | Clark | 52—255 |
| 1,804,564 | 5/1931 | McChesney | 52—255 |

FRANK L. ABBOTT, *Primary Examiner.*

WILLIAM I. MUSHAKE, *Examiner.*

T. W. FLYNN, *Assistant Examiner.*